(12) United States Patent
Kim et al.

(10) Patent No.: US 8,866,466 B2
(45) Date of Patent: *Oct. 21, 2014

(54) POWER GENERATING CIRCUIT AND SWITCHING CIRCUIT

(75) Inventors: Yu Sin Kim, Gyeonggi-do (KR); Dong Hyun Baek, Seoul (KR); Sun Woo Yun, Seoul (KR); Sung Hwan Park, Gyeonggi-do (KR)

(73) Assignees: Samsung Electro-Mechanics Co., Ltd., Gyunggi-Do (KR); Korea Advanced Institute of Science and Technology, Daejeon (KR)

( * ) Notice: Subject to any disclaimer, the term of this patent is extended or adjusted under 35 U.S.C. 154(b) by 91 days.

This patent is subject to a terminal disclaimer.

(21) Appl. No.: 13/494,920

(22) Filed: Jun. 12, 2012

(65) Prior Publication Data
US 2012/0319671 A1    Dec. 20, 2012

(30) Foreign Application Priority Data
Jun. 14, 2011 (KR) .................. 10-2011-0057626

(51) Int. Cl.
*G05F 3/04* (2006.01)
*H04B 1/48* (2006.01)
(52) U.S. Cl.
CPC ............ *H04B 1/48* (2013.01); *H04B 2001/485* (2013.01)
USPC .......................................... 323/311

(58) Field of Classification Search
USPC .......................... 323/265, 268, 311, 312, 318
See application file for complete search history.

(56) References Cited

U.S. PATENT DOCUMENTS

| | | | |
|---|---|---|---|
| 7,899,394 B2 * | 3/2011 | Rofougaran | 455/41.1 |
| 7,994,844 B2 * | 8/2011 | Chen et al. | 327/536 |
| 2001/0043094 A1 * | 11/2001 | Clark et al. | 327/112 |
| 2007/0024123 A1 * | 2/2007 | Pisasal et al. | 307/109 |
| 2008/0169851 A1 * | 7/2008 | Liu | 327/158 |

FOREIGN PATENT DOCUMENTS

| | | |
|---|---|---|
| CN | 1266292 A | 9/2000 |
| CN | 1390387 A | 1/2003 |
| KR | 2000-0021487 A | 4/2000 |
| KR | 10-2007-0121507 A | 12/2007 |

OTHER PUBLICATIONS

CN 201210200096.7 Office Action dated May 6, 2014; 19pgs.

* cited by examiner

*Primary Examiner* — Adolf Berhane
(74) *Attorney, Agent, or Firm* — Bracewell & Giuliani LLP; Brad Y. Chin

(57) ABSTRACT

The power generating circuit includes: a first transistor having a control terminal to which a second control signal is applied and one end to which a first control signal is applied; and a second transistor having a control terminal to which the first control signal is applied and one end to which the second control signal is applied, wherein the other ends of the first transistor and the second transistor are connected to an output terminal.

15 Claims, 4 Drawing Sheets

113

120

FIG. 6
111'
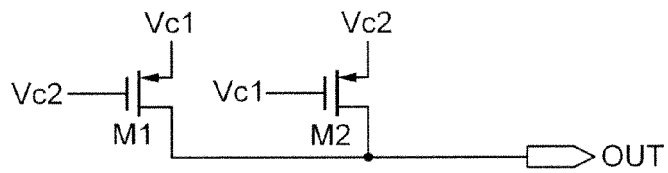
FIG. 7
111''
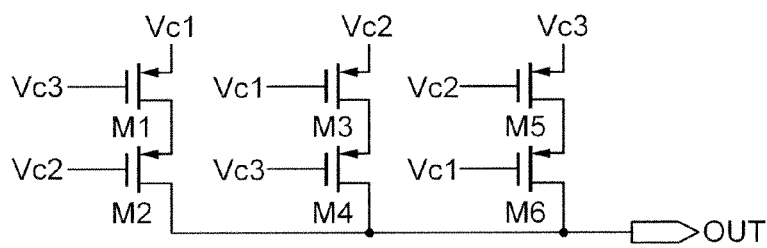
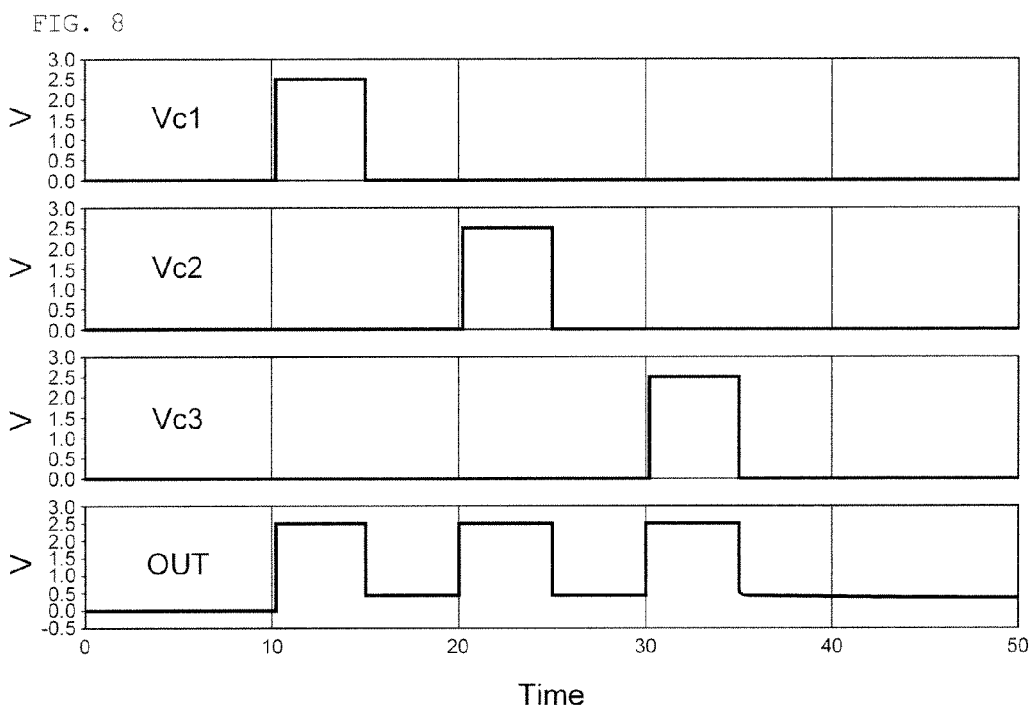
FIG. 8

POWER GENERATING CIRCUIT AND SWITCHING CIRCUIT

CROSS REFERENCE(S) TO RELATED APPLICATIONS

This application claims the benefit under 35 U.S.C. Section 119 of Korean Patent Application Serial No. 10-2011-0057626, entitled "Power Generating Circuit and Switching Circuit" filed on Jun. 14, 2011, which is hereby incorporated by reference in its entirety into this application.

BACKGROUND OF THE INVENTION

1. Technical Field

The present invention relates to a power generating circuit and a switching circuit.

2. Description of the Related Art

Recently, miniaturization of electronic devices, extension of a battery life through reduction in power consumption, and the like, have been in the limelight in the electronic and electric fields.

Meanwhile, even in the case of components having relatively small power consumption, they need to receive separate power from the outside to lead to a difficulty in making them on-chip with various components closely relevant thereto and they also need to be provided with a separate pin for receiving external power to thereby have a limitation in miniaturization thereof.

In general, when external power is supplied, power is continuously supplied regardless of an operation of the corresponding component, such that unnecessary power consumption is generated.

SUMMARY OF THE INVENTION

An object of the present invention is to provide a power generating circuit to which a control signal is applied to generate power.

Another object of the present invention is to provide a switching circuit.

According to an exemplary embodiment of the present invention, there is provided a power generating circuit, including: a first transistor having a control terminal to which a second control signal is applied and one end to which a first control signal is applied; and a second transistor having a control terminal to which the first control signal is applied and one end to which the second control signal is applied, wherein the other ends of the first transistor and the second transistor are connected to an output terminal.

When the first control signal or the second control is a turn-on signal, power may be output from the output terminal.

The first transistor and the second transistor may be P-type or an N-type MOS transistors.

According to another exemplary embodiment of the present invention, there is provided a power generating circuit, including: a first transistor having a control terminal to which a third control signal is applied and one end to which a first control signal is applied; a second transistor having a control terminal to which a second control signal is applied and one end to which the other end of the first transistor is connected; a third transistor having a control terminal to which the first control signal is applied and one end to which the second control signal is applied; a fourth transistor having a control terminal to which the third control signal is applied and one end to which the other end of the third transistor is connected; a fifth transistor having a control terminal to which the second control signal is applied and one end to which the third control signal is applied; and a sixth transistor having a control terminal to which the first control signal is applied and one end to which the other end of the fifth transistor is connected.

Here, the other ends of the second transistor, the fourth transistor, and the sixth transistor may be connected to an output terminal.

When any one of the first control signal, the second control signal, and the third control signal is a turn-on signal, power may be output from the output terminal.

The first transistor to the sixth transistor may be P-type or N-type MOS transistors.

According to another exemplary embodiment of the present invention, there is provided a power generating circuit, including: two transistors each having one end to which any one of two control signals is applied, a control terminal to which the other thereof is applied, and the other end to which an output terminal is connected.

Different control signals may be applied to gates of the two MOS transistors.

When any one of the two control signals is a turn-on signal, power may be output from the output terminal.

According to another exemplary embodiment of the present invention, there is provided a power generating circuit including two MOS transistors each having a source to which any one of two control signals is applied, a gate to which the other thereof is applied, and a drain to which an output terminal is connected.

Different control signals may be applied to the gates of the two MOS transistors.

When any one of the two control signals is a turn-on signal, power may be output from the output terminal.

The two MOS transistors may be P-type or N-type MOS transistors.

According to another exemplary embodiment of the present invention, there is provided a switching circuit including a power generating circuit receiving a control signal to generate power.

The switching circuit may further include a switching unit having a plurality of input and output terminals and a plurality of switches turning on/turning off between the respective input and output terminals.

The switching circuit may further include a buffer unit receiving the control signal to transfer the received control signal to the switching unit.

The buffer unit may receive power generated from the power generating circuit.

The switching circuit may further include an inverter unit receiving and inverting the control signal to transfer the inverted control signal to the switching unit.

The inverter unit may receive power generated from the power generating circuit.

The switching unit may include: a plurality of first switches turning-on/turning-off between each of the input and output terminals and the antenna; and a plurality of second switches turning-on/turning-off between each of the input and output terminals and a ground terminal.

The switching circuit may further include a buffer unit receiving the control signal to transfer the received control signal to the switching unit.

The buffer unit may receive power generated from the power generating circuit.

The switching circuit may further include an inverter unit receiving and inverting the control signal to transfer the inverted control signal to the switching unit.

The inverter unit may receive power generated from the power generating circuit.

Signal output from the buffer unit may be applied to the first switch or the second switch to control a turn-on/turn-off thereof.

Signal output from the buffer unit may be applied to the first switch or the second switch to control a turn-on/turn-off thereof, and a control signal not passing through the buffer unit is applied to one of the first and second switches, which does not receive the signal output from the buffer unit.

A signal passing through the inverter unit may be applied to one of the first and second switches, which does not receive the signal output from the buffer unit.

The first switch may be a series switch and the second switch may be a shunt switch.

The power generating circuit may be connected to the buffer unit and/or the inverter unit to thereby supply power thereto.

BRIEF DESCRIPTION OF THE DRAWINGS

FIG. 6 is a diagram showing a power generating circuit according a first exemplary embodiment of the present invention;

FIG. 7 is a diagram showing a power generating circuit according to a second exemplary embodiment of the present invention; and FIG. 8 is a diagram showing signals of the input and output terminals of the power generating circuit of FIG. 7.

DESCRIPTION OF THE PREFERRED EMBODIMENTS

Figure 1:
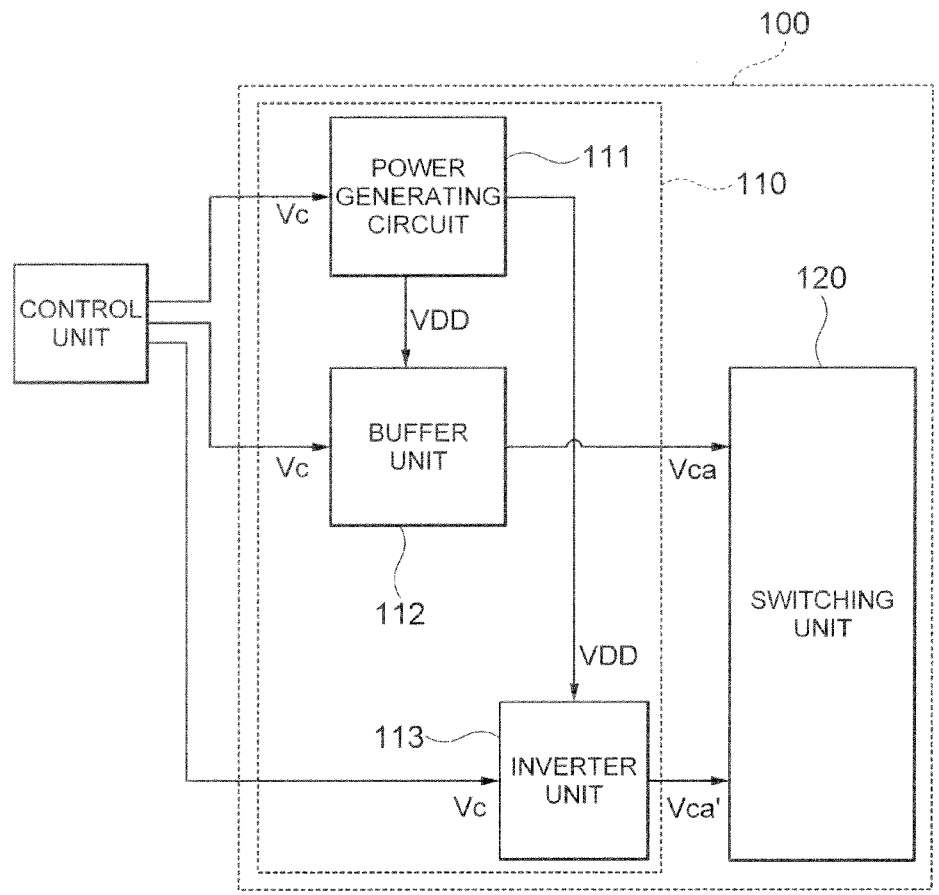
FIG. 1 is a diagram schematically showing a switching circuit according to an exemplary embodiment of the present invention.

Various advantages and features of the present invention and methods accomplishing thereof will become apparent from the following description of embodiments with reference to the accompanying drawings. However, the present invention may be modified in many different forms and it should not be limited to the embodiments set forth herein. These embodiments may be provided so that this disclosure will be thorough and complete, and will fully convey the scope of the invention to those skilled in the art. Like reference numerals in the drawings denote like elements.

Terms used in the present specification are for explaining the embodiments rather than limiting the present invention. Unless explicitly described to the contrary, a singular form includes a plural form in the present specification. The word "comprise" and variations such as "comprises" or "comprising," will be understood to imply the inclusion of stated constituents, steps, operations and/or elements but not the exclusion of any other constituents, steps, operations and/or elements.

Hereinafter, the present invention will be described in detail with reference to the accompanying drawings.

FIG. 1 is a diagram schematically showing a switching circuit according to an exemplary embodiment of the present invention.

Referring to FIG. 1, a switching circuit 100 according to an exemplary embodiment of the present invention may be configured to include a driving unit 110 and a switching unit 120.

In this case, the driving unit 110 may be configured to include a power generating circuit 111, a buffer unit 112, and an inverter unit 113.

The power generating circuit 111 may be applied with a control signal generated from a control unit that may be implemented as various chipsets to serve to function for generating power voltage VDD to be supplied to the buffer unit 112 and/or the inverter unit 113.

Therefore, the buffer unit 112 and the inverter unit 113 may be applied with power supplied from the power generating circuit 111, without separate external power, and be driven, such that the entire size of the switching circuit 100 may be reduced.

Meanwhile, the switching unit 120 may include a plurality of input and output terminals, an antenna, and switches, and serve to connect or block specific input and output terminals to or from the antenna.

Figure 2:
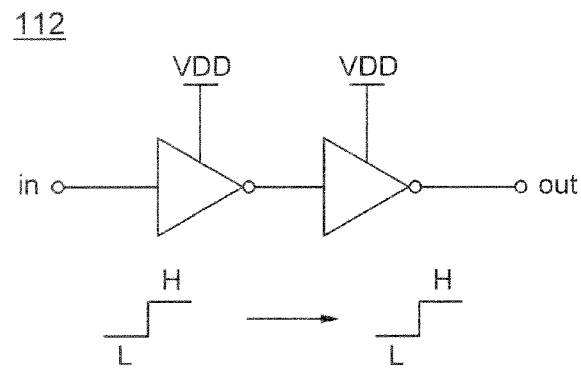
FIG. 2 is a diagram showing a configuration of a buffer unit and signal transfer characteristics thereof.
Figure 3:
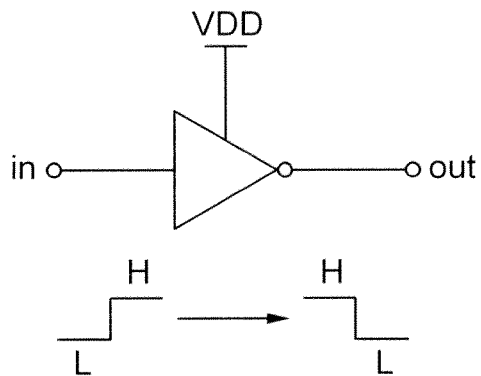
FIG. 3 is a diagram showing a configuration of an inverter unit and signal transfer characteristics thereof.

FIG. 2 is a diagram showing a configuration of a buffer unit 112 and signal transfer characteristics thereof, and FIG. 3 is a diagram showing a configuration of an inverter unit 113 and signal transfer characteristics thereof.

As shown in FIGS. 2 and 3, the buffer unit 112 outputs the same control signal as the input control signal and the inverter unit 113 inverts the input control signal to output the inverted control signal.

In this case, the power generating circuit 111 may be connected to the buffer unit 112 and/or the inverter unit 113 to supply power thereto, such that the buffer unit 112 and the inverter unit 113 may be driven without separate external power.

Figure 4:
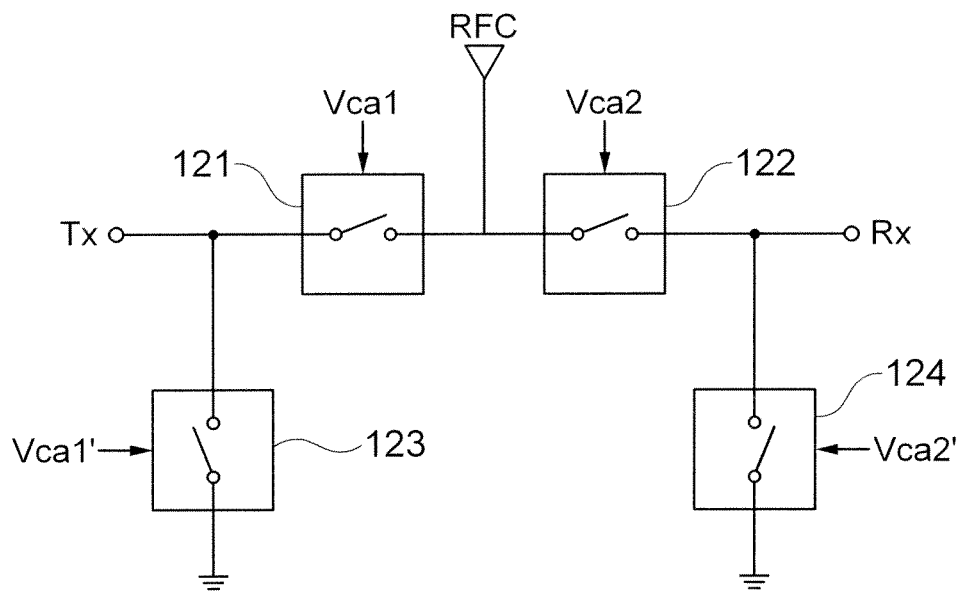
FIG. 4 is a diagram showing a switching unit according to an exemplary embodiment of the present invention.

FIG. 4 is a diagram showing a switching unit 120 according to an exemplary embodiment of the present invention.

Referring to FIG. 4, the switching unit 120 may be configured to include a plurality of input and output terminals, an antenna, and switches. In this case, the switch may include a first switch and a second switch.

The first switch is provided in each of the input and output terminals and the antenna to perform a turn-on/turn-off operation, thereby making it possible to connect or block specific input and output terminals to or from the antenna, and the second switch is provided in each of the input and output terminals and a ground terminal to perform a turn-on/turn-off operation, thereby making it possible to connect or block the input and output terminals to or from the ground terminal.

In FIG. 4, a first series switch 121 and a second series switch 122 may correspond to the first switch and a first shunt switch 123 and a second shunt switch 124 may correspond to the second switch.

In this case, a control signal Vca1 output from the buffer unit 112 is applied to the first series switch 121 and a control signal Vca2 output therefrom is applied to the second series switch 122, thereby making it possible to turn-on/turn-off the corresponding switch.

In addition, a control signal Vca1' output from the inverter unit 113 is applied to the first shunt switch 123 and a control signal Vca2' output therefrom is applied to the second shunt switch 124, thereby making it possible to turn-on/turn-off the corresponding switch.

Meanwhile, the buffer unit 112 and the inverter unit 113 may be applied with the same control signal, wherein the inverter unit 113 may invert the input control signal and output the inverted control signal.

Therefore, the signals Vca1 and Vca2 output from the buffer unit 112 may have a complementary relationship with the signals Vca1' and Vca2' output from the inverter unit 113. That is, when the signal Vca1 is an H signal, the signal Vca1' may be an L signal.

Therefore, the first series switch 121 and the first shunt switch 123 may be complementarily turned-on/turned-off, and the second series switch 122 and the second shunt switch 124 may also be complementarily turned-on/turned-off.

Figure 5:
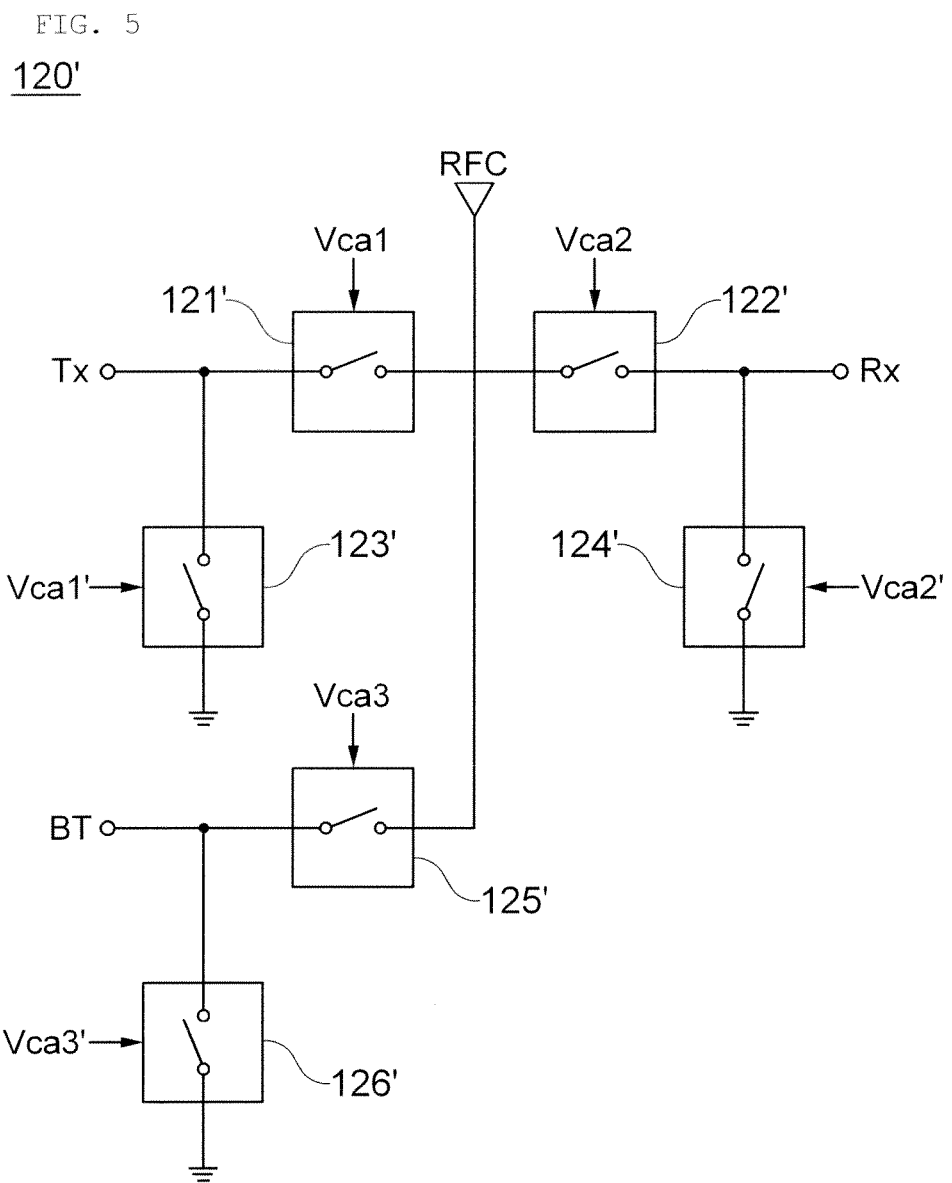
FIG. 5 is a modified example of FIG. 4.

FIG. 5 is a modified example of FIG. 4, wherein the switching unit 120 having three input and output terminals is illustrated.

In this case, the input and output terminals are illustrated as Tx, Rx, and Bt in FIG. 5 but they are not limited thereto. Referring to FIG. 5, each of the control signals Vca1, Vca2, and Vca3 passing through the buffer unit 112 controls the turn-on/turn-off of each of a first series switch 121', a second series switch 122', and a third series switch 125' provided between input and output terminals Tx, Rx, and BT and an antenna RFC, thereby making it possible to connect or block each of the input and output terminals to or from the antenna.

In this case, the signals Vca1', Vca2', and Vca3' output from the inverter unit may connect or block the input and output terminals of each of a first shunt switch 123', a second shunt switch 124', and a third shunt switch 126' provided between the input and output terminals and a ground to or from the ground.

In addition, with respect to the signals Vc1, Vc2, and Vc3, at least two signals thereof may not be simultaneously H signals as shown in FIG. 8. Therefore, the input and output terminals Tx, Rx, and BT are not simultaneously connected to the antenna.

The signal Vca1' is an inverted signal of Vc1, such that the first, second, and third series switches and the first and, second, and third shunt switches may be complementarily turned-on/turned-off.

In general, minute signals may pass through the switches even in a turn-off state.

However, the first, second, and third series switches and the first, second, and third shunt switches are complementarily operated as described above, such that when one input and output terminals are connected to the antenna, it is possible to more completely block between the other input and output terminals and the antenna, whereby noise of the signal transmitted between the input and output terminals and the antenna can be reduced and accuracy may be improved.

FIG. 6 is a diagram showing a power generating circuit 111 according to a first exemplary embodiment of the present invention.

Referring to FIG. 6, the power generating circuit according to the first exemplary embodiment of the present invention may be configured to include two transistors and a single output terminal.

The transistor may include a control terminal and two terminals, wherein the control terminal and one of the terminals may have different control signals applied thereto.

In the transistor, one of two control signals may be applied to one end thereof, the other of the two control signals may be applied to the control terminal, and the other end thereof may be connected to the output terminal.

In this case, different control signals may be applied to the control terminals of the two transistors constituting the power generating circuit.

Meanwhile, the transistor may be implemented as a MOS transistor.

That is, the transistor may be implemented as two MOS transistors each having a source to which one of the two control signals is applied, a gate to which the other thereof is applied, and a drain to which the output terminal is connected.

In addition, the two MOS transistors may have gates having different control signals applied thereto.

In this case, the two MOS transistors may be P-type or N-type MOS transistors.

In FIG. 6, the two transistors or MOS transistors may be M1 and M2 and the two control signals may be Vc1 and Vc2.

Meanwhile, referring to FIG. 6, the power generating circuit 111 may include a first MOS transistor M1 and a second MOS transistor M2.

The first MOS transistor M1 may be configured to have a gate to which the second control signal is applied, a source to which the first control signal is applied, and a drain to which the output terminal is connected, and the second MOS transistor M2 may be configured to have a gate to which the first control signal is applied, a source to which the second control signal is applied, and a drain to which the output terminal is connected.

Meanwhile, the first MOS transistor and the second MOS transistor may be P-type MOS transistors.

TABLE 1

| Vc1 | Vc2 | OUT |
|-----|-----|-----|
| H   | L   | H   |
| L   | H   | H   |
| L   | L   | L   |

As shown in Table 1, the control signals Vc1 and Vc2 may be an H signal or an L signal and a principle of the power generating circuit 111 according to the an exemplary embodiment of the invention generating power voltage in each case will be described below.

First referring to FIG. 6, when the control signal Vc1 is an H signal and the control signal Vc2 is an L signal, the first MOS transistor M1 may be in a turn-on state and the H signal may be output from the output terminal OUT.

In addition, when the control signal VC1 is an L signal and the control signal Vc2 is an H signal, the second MOS transistor M2 may be in a turn-on state and the H signal may be output from the output terminal OUT.

However, when both the control signals VC1 and Vc2 are an L signal, both the first MOS transistor M1 and the second MOS transistor M2 are in a turn-off state and the L signal is output from the output terminal OUT.

FIG. 7 is a diagram showing a power generating circuit 111 according to a second exemplary embodiment of the present invention, wherein the power generating circuit 111 may be applied to a case in which there are three control signals.

Referring to FIG. 7, the power generating circuit 111 may include a first MOS transistor M1 to a sixth MOS transistor M6.

The first MOS transistor M1 may have a gate to which a third control signal Vc3 is applied and a source to which a first control signal Vc1 is applied, and the second MOS transistor M2 may have a gate to which a second control signal Vc2 is applied, a source to which a drain of the first MOS transistor M1 is connected, and a drain to which an output terminal is connected.

The third MOS transistor M3 may have a gate to which a first control signal is applied and a source to which a second control signal is applied, and the fourth MOS transistor M4 may have a gate to which a third control signal is applied, a source to which a drain of the third MOS transistor M3 is connected, and a drain to which an output terminal is connected.

The fifth MOS transistor M5 may have a gate to which a second control signal Vc2 is applied and a source to which a third control signal Vc3 is applied, and the sixth MOS transistor M6 may have a gate to which a first control signal Vc1 is applied, a source to which a drain of the fifth MOS transistor M5 is connected, and a drain to which an output terminal is connected.

In this case, the first MOS transistor M1 to the sixth MOS transistor M6 may be P-type MOS transistors.

TABLE 2

| Vc1 | Vc2 | Vc3 | OUT |
| --- | --- | --- | --- |
| H | L | L | H |
| L | H | L | H |
| L | L | H | H |
| L | L | L | L |

Meanwhile, as shown in Table 2, the control signals Vc1, Vc2, and Vc3 may be an H signal or an L signal and a principle of generating power voltage in each case will be described below.

First referring to FIG. 7, when the control signals Vc1, Vc2, and Vc3 are an H signal, an L signal, and an L signal, respectively, the first MOS transistor M1 is in a turn-on state and the second MOS transistor M2 is also in a turn-on state, such that the H signal is output from the output terminal OUT. In this case, the third MOS transistor M3 to the sixth transistor M6 are in a turn-off state.

Next, when the control signals Vc1, Vc2, and Vc3 are an L signal, an H signal, and an L signal, respectively, the third MOS transistor M3 is in a turn-on state and the fourth MOS transistor M4 is also in a turn-on state, such that the H signal is output from the output terminal OUT. In this case, the first MOS transistor M1, the second MOS transistor M2, the fifth MOS transistor M5, and the sixth transistor M6 are in a turn-off state.

Next, when the control signals Vc1, Vc2, and Vc3 are an L signal, an L signal, and an H signal, respectively, the fifth MOS transistor M5 is in a turn-on state and the sixth MOS transistor M6 is also in a turn-on state, such that the H signal is output from the output terminal OUT. In this case, the first MOS transistor M1 to the fourth transistor M4 are in a turn-off state.

Finally, when the control signals Vc1, Vc2, and Vc3 are an L signal, an L signal, and an L signal, respectively, the first MOS transistor M1 to the sixth MOS transistor M6 are in a turn-off state, such that the L signal is output from the output terminal OUT.

FIG. 8 is a diagram showing signals of the input and output terminals of the power generating circuit 111 of FIG. 7.

A switching control signal used in various electronic devices generally ranges from 2 to 3.5V.

In FIG. 8, it is assumed that when the control signals Vc1, Vc2, and Vc3 are an H signal, they are 2.5V, and when they are an L signal, they are 0V.

It may be appreciated from FIG. 8 that the H signal is output when any one of the control signals Vc1, Vc2, and Vc3 is an H signal, and the L signal is output when the control signals Vc1, Vc2, and Vc3 are an L signal.

Therefore, power consumption may further be reduced compared with a case in which the control signals are continuously in an H signal state by external power.

The power generating circuit of the present invention configured as described above can generate power only with a control signal, thereby making it possible to miniaturize various electronic devices.

In addition, the switching circuit having the power generating circuit of the present invention can be further miniaturized as compared with the related art.

In addition, power is generated only when a control signal corresponding to a turn-on or H signal, thereby making it possible to reduce power consumption as compared to a case of the related art in which external power is continuously supplied.

The present invention has been described in connection with what is presently considered to be practical exemplary embodiments. Although the exemplary embodiments of the present invention have been described, the present invention may also be used in various other combinations, modifications and environments. In other words, the present invention may be changed or modified within the range of concept of the invention disclosed in the specification, the range equivalent to the disclosure and/or the range of the technology or knowledge in the field to which the present invention pertains. The exemplary embodiments described above have been provided to explain the best state in carrying out the present invention. Therefore, they may be carried out in other states known to the field to which the present invention pertains in using other inventions such as the present invention and also be modified in various forms required in specific application fields and usages of the invention. Therefore, it is to be understood that the invention is not limited to the disclosed embodiments. It is to be understood that other embodiments are also included within the spirit and scope of the appended claims.

What is claimed is:

1. A power generating circuit, comprising:
   a first transistor having a control terminal to which a second control signal is applied and one end to which a first control signal is applied; and
   a second transistor having a control terminal to which the first control signal is applied and one end to which the second control signal is applied,
   wherein the other ends of the first transistor and the second transistor are connected to an output terminal, and
   wherein the first control signal and the second control signal are each one of a H signal or an L signal, a H signal is output when at least one of the first control signal and the second control signal is the H signal, and an L signal is output when the first control signal and the second control signal are the L signal.

2. The power generating circuit according to claim 1, wherein when the first control signal or the second control is a turn-on signal, power is output from the output terminal.

3. The power generating circuit according to claim 1, wherein the first transistor and the second transistor are P-type or an N-type MOS transistors.

4. A power generating circuit, comprising:
   a first transistor having a control terminal to which a third control signal is applied and one end to which a first control signal is applied;
   a second transistor having a control terminal to which a second control signal is applied and one end to which the other end of the first transistor is connected;
   a third transistor having a control terminal to which the first control signal is applied and one end to which the second control signal is applied;
   a fourth transistor having a control terminal to which the third control signal is applied and one end to which the other end of the third transistor is connected;
   a fifth transistor having a control terminal to which the second control signal is applied and one end to which the third control signal is applied; and a sixth transistor having a control terminal to which the first control signal is applied and one end to which the other end of the fifth transistor is connected, wherein the other ends of the second transistor, the fourth transistor, and the sixth transistor are connected to an output terminal.

5. The power generating circuit according to claim 4, wherein when any one of the first control signal, the second control signal, and the third control signal is a turn-on signal, power is output from the output terminal.

6. A switching circuit comprising:
the power generating circuit according to claim 1;
an antenna; and
a switching unit having a plurality of input and output terminals and a plurality of switches turning on/turning off between the respective input and output terminals.

7. The switching circuit according to claim 6, further comprising a buffer unit receiving the control signal to transfer the received control signal to the switching unit wherein the buffer unit receives power generated from the power generating circuit.

8. The switching circuit according to claim 6, further comprising an inverter unit receiving and inverting the control signal to transfer the inverted control signal to the switching unit, wherein the inverter unit receives power generated from the power generating circuit.

9. A switching circuit comprising:
an antenna;
a switching unit having a plurality of input and output terminals and a plurality of switches turning on/turning off between the respective input and output terminals; and
a power generating circuit receiving a control signal to generate power,
wherein the power generating circuit includes two transistors each having one end to which any one of the two control signals is applied, a control terminal to which the other thereof is applied, and the other end to which an output terminal is connected, and
wherein the switching unit includes:
a plurality of first switches turning-on/turning-off between each of the input and output terminals and the antenna; and
a plurality of second switches turning-on/turning-off between each of the input and output terminals and a ground terminal.

10. The switching circuit according to claim 9, further comprising:
a buffer unit receiving the control signal to transfer the received control signal to the switching unit; and
an inverter unit receiving and inverting the control signal to transfer the inverted control signal to the switching unit,
wherein signal output from the buffer unit is applied to the first switch or the second switch to control a turn-on/turn-off thereof.

11. The switching circuit according to claim 9, further comprising:
a buffer unit receiving the control signal to transfer the received control signal to the switching unit; and
an inverter unit receiving and inverting the control signal to transfer the inverted control signal to the switching unit,
wherein signal output from the buffer unit is applied to the first switch or the second switch to control a turn-on/turn-off thereof, and
a control signal not passing through the buffer unit is applied to one of the first and second switches, which does not receive the signal output from the buffer unit.

12. The switching circuit according to claim 11, wherein a signal passing through the inverter unit is applied to one of the first and second switches, which does not receive the signal output from the buffer unit.

13. A switching circuit comprising:
an antenna;
a switching unit having a plurality of input and output terminals and a plurality of switches turning on/turning off between the respective input and output terminals; and
a power generating circuit receiving a control signal to generate power,
wherein the power generating circuit includes:
a first transistor having a control terminal to which a third control signal is applied and one end to which a first control signal is applied;
a second transistor having a control terminal to which a second control signal is applied and one end to which the other end of the first transistor is connected;
a third transistor having a control terminal to which the first control signal is applied and one end to which the second control signal is applied;
a fourth transistor having a control terminal to Which the third control signal is applied and one end to which the other end of the third transistor is connected;
a fifth transistor having a control terminal to which the second control signal is applied and one end to which the third control signal is applied; and
a sixth transistor having a control terminal to which the first control signal is applied and one end to which the other end of the fifth transistor is connected,
the other ends of the second transistor, the fourth transistor, and the sixth transistor being connected to an output terminal.

14. A switching circuit, comprising:
an antenna;
a first series switch having one end to which the antenna is connected;
a first input and output terminal connected to the other end of the first series switch;
a second series switch having one end to which the antenna is connected;
a second input and output terminal connected to the other end of the second series switch;
a ground terminal;
a first shunt switch having one end to which the ground terminal is connected and the other end to which the first input and output terminal is connected;
a second shunt switch having one end to which the ground terminal is connected and the other end to which the second input and output terminal is connected;
a buffer unit receiving the first control signal to transfer the received first control signal to the first series switch and receiving the second control signal to transfer the received second control signal to the second series switch;
an inverter unit receiving and inverting the first control signal to transfer the inverted first control signal to the first shunt switch and receiving and inverting the second control signal to transfer the inverted second control signal to the second shunt switch; and
a power generating circuit connected to the buffer unit and/or the inverter unit to supply power thereto,
wherein the power generating circuit includes a first transistor having a control terminal to which the second control signal is applied and one end to which the first control signal is applied; and a second transistor having a control terminal to which the first control signal is applied and one end to which the second control signal is applied, the other ends of the first transistor and the second transistor being connected to an output terminal.

15. The switching circuit according to claim 14, wherein the first control signal passing through the buffer unit and then applied to the first series switch controls a turn-on/turn-off of the first series switch and the second control signal passing through the buffer unit and then applied to the second series switch controls a turn-on/turn-off of the second series switch, and the first control signal passing through the inverter unit and then applied to the first shunt switch controls a turn-on/turn-off of the first shunt switch and the second control signal passing through the inverter unit and then applied to the second shunt switch controls a turn-on/turn-off of the second shunt switch.

\* \* \* \* \*